Aug. 9, 1932.  L. A. CUMMINGS  1,871,116

SHAFT MOUNTING

Filed Nov. 21, 1928

INVENTOR.
Lloyd A. Cummings
by Parker & Prochnow
ATTORNEYS.

Patented Aug. 9, 1932

1,871,116

UNITED STATES PATENT OFFICE

LLOYD A. CUMMINGS, OF JAMESTOWN, NEW YORK, ASSIGNOR TO MARLIN-ROCKWELL CORPORATION, OF JAMESTOWN, NEW YORK

SHAFT MOUNTING

Application filed November 21, 1928. Serial No. 320,920.

This invention relates to shaft mountings, and particularly to a type which may be utilized advantageously in the support from a frame, such as a vehicle frame, of one of the sections of a propeller or driving shaft.

In the usual motor vehicle, the propeller shaft extends at an inclination from the transmission to the differential, and at its opposite ends is connected by universal joints or couplings to the transmission shaft and to the driving shaft or element of the differential. In large trucks or busses, for example, the propeller shaft can not be arranged in this manner because with the greater length of the shaft, the shaft would flex and whip to an objectionable extent. To prevent this whipping or flexing, an intermediate shaft section or rearward extension of a transmission shaft may be provided, which is mounted in bearings carried by the vehicle and connected by a universal joint to a short inclined propeller shaft leading to the differential.

A shaft mounting constructed in accordance with this invention may be advantageously utilized for the support of the intermediate shaft section above mentioned, although it may be applied also to various other constructions.

An object of this invention is to provide an improved shaft mounting which will not only adequately support the shaft, but also permit limited self-alignment, and which will be relatively simple, effective, compact and inexpensive.

Another object of this invention is to provide an improved shaft support, or mounting, which will function effectively under out of line conditions, and with bent shafts.

Another object of the invention is to provide an improved device for supporting from the vehicle frame, propeller or drive shafts of motor vehicles or the like, and which will effectively care for frame weave; and which will function effectively under out of line conditions and with bent shafts.

Various other objects and advantages will be apparent from the following description of an embodiment of the invention, and the novel features will be particularly pointed out hereinafter in connection with the appended claims.

In the accompanying drawing:—

Fig. 1 is a sectional elevation of a shaft mounting for vehicle propeller shafts, and constructed in accordance with this invention;

Fig. 2 is a front elevation of the same, viewed from a transverse section through the shaft in advance of the mounting; and Fig. 3 is a diagram illustrating the manner in which the mounting may be applied to propeller shafts of motor vehicles.

In the illustrated embodiment of the invention, and referring particularly to Fig. 3, the engine 1 is connected through a transmission 2 to a universal joint or coupling 3, and through the latter to one end of a mid-section 4 of a propeller shaft. The other end of the section 4 of the propeller shaft is connected by a universal coupling 5 to another and inclined shaft section 6, the latter being connected at its lower end by a universal joint or coupling 7 to the driving shaft 8 of the differential 9 at the rear axle.

The shaft section 4 is provided with a bearing 10 at a point just forwardly of the universal coupling 5, and this bearing may have a ball or roller bearing unit 11 therein, or be otherwise constructed in any desired manner. The housing or frame of the bearing 10 is provided with a flange 12 which extends upwardly therefrom and this flange at its upper end is secured, such as by bolts 13, to the lower edge of a slab or plate 14 of resilient, flexible material, such as resilient rubber. The upper edge of this plate 14 is in turn secured, such as by bolts 15, to a cross frame or brace 16 of the vehicle frame.

Rigid clamping strips 17, such as metallic bars or strips, may be disposed along the lower edge of the plate 14 at the face opposite that engaged by the flange 12, and the bolts 15 pass through this strip. Thus the plate 14 will be securely clamped to the flange 12, in a manner which will not tear the plate by the stresses placed thereon, and the stresses transmitted from the flange 12 to the plate 14 will be distributed uniformly along the lower edge of the plate.

A similar strip 18 will be provided along the upper edge of the plate 14, and through it the bolts 15 will pass for a similar purpose. To more thoroughly secure the various parts to the plate, the faces of the flange 12 and the strips 17 and 18 which engage the plate 14 may have serrated or roughened surfaces which imbed themselves in the plate 14 and thus have a firmer grip thereon.

It will be observed that the plate 14 is a suspended flexible strip, with the bearing connected to the lower edge thereof, and that therefore the plate will be subjected to both tension and compression stresses. The plate 14 is preferably made of soft, resilient rubber, but is also preferably provided with a plurality of layers or plies of fabric 19 which are incorporated in the plate in a manner similar to the incorporation of the reinforcing fabric layers or plies in rubber tire casings for motor vehicles.

With a shaft mounting constructed in this manner, the mounting can yield sufficiently to take care of frame weave of the vehicle when driven over uneven roadways, and the resiliency of the mounting also compensates for any misalignment of the shafts.

With such a construction, one can employ a relatively thick rubber plate and still obtain the relatively large flexibility necessary for bending about a cross axis, and the relatively small flexibility necessary to permit twisting or weaving of the frame. The flexible strip enables the bearing to function properly in case of a bent shaft with its tendency to continually wiggle the bearing housing, also in case of angular misalignment, and will permit an accommodation of the bearing to out of line conditions in an initial set up, in any of the three directions, that is, sidewise, upward, or endwise.

While the mounting has been described and illustrated in connection with its use as a mounting for vehicle propeller shafts, it will be understood that it may be applied to the support of other shafts where similar operating conditions or problems are encountered.

It will be obvious that various changes in the details, which have been herein described and illustrated in order to explain the nature of the invention, may be made by those skilled in the art within the principle and scope of the invention as expressed in the appended claims.

Claims:—

1. A device for mounting the drive shaft of a motor vehicle, between the universal joints thereof, from the vehicle frame, which comprises a bearing rotatably mounting the shaft closely adjacent a universal joint thereof, and a relatively short and wide plate of flexible, resilient material with laminations of fabric incorporated therein connected at one end to said bearing and at its other end to said frame.

2. A device for mounting the drive shaft of a motor vehicle, between the universal joints thereof, from the vehicle frame, which comprises a bearing rotatably mounting the shaft closely adjacent a universal joint thereof, and a relatively short and wide plate of flexible, resilient material connected at one end to said bearing and at its other end to said frame, and disposed with its faces crosswise of the axis of the shaft.

LLOYD A. CUMMINGS.